United States Patent [19]

Siegwart

[11] 3,965,928
[45] June 29, 1976

[54] FLOW REGULATOR FOR DUCTS
[76] Inventor: Emil Siegwart, Michael-Blatter-Str. 6, 6603 Sulzbach-Neuweiler, Germany
[22] Filed: Oct. 9, 1975
[21] Appl. No.: 621,169

[30] Foreign Application Priority Data
Oct. 10, 1974 Germany............................ 2448271

[52] U.S. Cl................................ 137/499; 137/521
[51] Int. Cl.².......................................... F16K 31/36
[58] Field of Search............................ 137/499, 521

[56] References Cited
UNITED STATES PATENTS
3,187,768   6/1965   Waterfill......................... 137/499 X
3,452,762   7/1969   Fahre................................. 137/499

Primary Examiner—Henry T. Klinksiek
Attorney, Agent, or Firm—Larson, Taylor & Hinds

[57] ABSTRACT

The specification describes a flow regulator for ducts in the case of which the free cross-section of the duct is arranged to be varied by a flap which can be turned against spring force by the flow in the closing direction. The flap is angled adjacent to the shaft and its one limb in the open position is directed substantially parallel to the axis of the duct to the rear and its other limb is directed in the closed position substantially perpendicularly to the duct axis. The spring force is adapted to act from the direction of the wall of the duct on a lever arm attached to the shaft in such a manner that the point of action of the force on rotation of the flap out of the open position into the closed position describes a circular arc, which are at the beginning is more oblique to the direction of the spring force than at the end.

13 Claims, 5 Drawing Figures

FLOW REGULATOR FOR DUCTS

The invention relates to a flow regulator for ducts, in the case of which the free cross-section of the duct is arranged to be varied by a flap, which, arranged on a shaft adjacent to a center axis of the cross-section, can be turned against spring force by the flow in the closing direction and in the case of which the flap is angled adjacent to the shaft and its one limb in the open position is directed substantially parallel to the axis of the duct to the rear and its other limb is directed in the closed position substantially perpendicularly to the duct axis.

The said one limb is then directed obliquely to the rear in the closed position and the said other limb is directed obliquely forwards against the flow in the open position.

Such flow regulators are characterised by operability at particularly low pressures, apart from other advantages.

One aim of the present invention is that of providing an even further increase in the sensitivity of flow regulators of the type described and of abtaining further advantages which are mentioned below.

In accordance with the invention there is the provision of the feature for this purpose that the above-mentioned spring force is adapted to act from the direction of the wall of the duct on a lever arm attached to the shaft in such a manner that the point of action of the force on rotation of the flap out of the open position into the closing position describes a circular arc, which at the beginning is more oblique to the direction of the spring force than at the end.

This spring force engagement which is transposed into the cross-section of the duct and is converted by the decreasing oblique setting of the lever arm arc from the proportionality of the spring force into a lever force which increases out of proportion and is required for the flap, allows a more freely running bearing means for the shaft than the arrangement previonsly proposed in which the torque is carried through the shaft from a position outside the cross-section of the duct so that the regulator can respond even in the case of still smaller pressures. Point bearings for the shaft become possible in the case of which there is no contact at all on the duct wall by the edge of the flap with the exception of engagement in the closed position. Furthermore, the new spring arrangement in the duct is simpler. Finally, the substantial advantage must be mentioned of the possibility making the flow regulator in a fluid-tight manner so that it can also be used in gas ducts and in liquid ducts.

A particularly simple and convenient embodiment of the spring engagement envisages the use of a helical spring which is preferably directed substantially perpendicularly to the axis of the duct and engages the lever arm.

In order to make it possible to adjust the spring force the helical spring is preferably fastened at the side of the duct wall on an adjustable holding means. For example, the spring can be fixed to a rod projecting into the duct, which has its end remote from the spring attached to the membrane of a membrane chamber or transducer adapted to be actuated by air under pressure, so that the rod can be shifted by remote control and can therefore change the biasing action of the spring.

A particularly inventive and significant further development of the invention is that the holding means has a rod, arranged for axial shifting movement and rotary movement, extending axially into the helical spring and the latter is held by the rod by means of a transverse pin arranged at the end of the rod and this transverse pin extends between the coils of the helical spring. Thus, while the above-mentioned axial shifting of the rod by the compressed air transducer or diaphragm chamber only changes the biasing action of the spring, a rotation of the rod, which has its cross pin fitted between the helical coils of the spring, shortens or elongates the spring owing to reduction or increase in the number of the effective helical coils and accordingly causes the characteristic of the spring to become steeper or less steep in slope; the possibility of influencing the biasing action of the spring is given in this case as well owing to the axial possibility of shifting the rod in addition to the possibility of rotation.

This embodiment of the flow regulator in accordance with the invention can be manufactured as a standard unit and it can then be adapted to suit the respectively given conditions of use by suitable setting of the spring holding means.

A particularly advantageous further development of the invention involves the rod being journalled by screw means, the screw means having the same or a slightly smaller lead as or than the helical spring in the unstressed condition. In the case of adaptation of the regulator to suit certain conditions of regulation this measure makes it possible to undertake the adjustment of the spring to a certain effective spring length simultaneously with the shifting, necessary as regards the biasing conditions of the spring, of the outer spring attachment point: The biasing of the spring in the open position of the flap is to be at the most only a few degrees above zero, at any rate for low upstream pressures of the flowing medium. Therefore, in the case of the maximum spring length which is effective the outer spring attachment point, the above-mentioned transverse pin, will be so placed that the spring is hardly stressed at all in the open position of the flap. If now the rod is turned, in the case of a screw lead which is the same as the pitch of the spring, the transverse pin will only screw itself forwards in the spring, that is to say it will shorten the effective spring length to a lower number of coils without in so doing drewing the spring coils outwards and thus producing a stronger and stronger degree of biasing. Even although on screwing in the rod the effective residual coils of the spring are slightly pulled up so that in relationship to the steepness of the spring characteristic only a small biasing action is produced, this will not be a matter of concern in most cases.

From the design point of view it is advantageous if the rod extends through a tube connector arranged at the wall of the duct and has its end mounted on a screw cap placed on the tube connector. This adjustable holding means can if necessary be sealed between the rod and the inner wall of the tube connector; furthermore, in the case of suitable dimensioning the tube connector can accommodate part of the spring so that the latter can have a longer length.

If the helical spring is provided with a stiffening means, the regulating flap can also be used for positive closing of the cross-section of the duct. In the case of a helical spring with a fixed length the stiffening means can for example consist of cylindrical chocks which are fitted into the helical spring and are rounded at one end.

Finally, having regard to the functional accuracy of the flap, more particularly as regards the freely running bearing means intended, there is the provision of an axial disc in the duct which lies in the direction of flow downstream from the flap shaft and is aligned with the latter, the rear end of the disc as regards its position and contour being substantially a representation, conforming with the flow, of the first-mentioned flap limb in the case of the half open position of the flap. Such a disc terminates the diffusor angle downstream from the first-mentioned flap limb so that between the latter, the disc and the flow wall, extending from the edge of the flap limb, the air is enclosed, that is to say it stands stationary and no turbulence can act on the flap limb.

The angled flap is under normal flow conditions admittedly stable even without such a disc but however if certain conditions of excitation occur as for example certain vibrations in the gas column, it may be that the flap does in fact tend to perform fluttering movements. The disc provided can prevent this with the above-mentioned enclosed air, which acts as a damping cushion without on the other hand giving rise to larger bearing forces, as occur in the case of previously proposed damping means which increase the mass and accordingly the sensitivity of the regulator is not impaired. Even although, strictly speaking, different forms of the disc correspond to different flow speeds and positions of opening of the flap, the disc can be made with a mean value as regards the shape and size so that it has the desired effect in all these conditions.

In what follows the invention will be described with reference to some embodiments as shown in the accompanying drawings.

Figure 1:
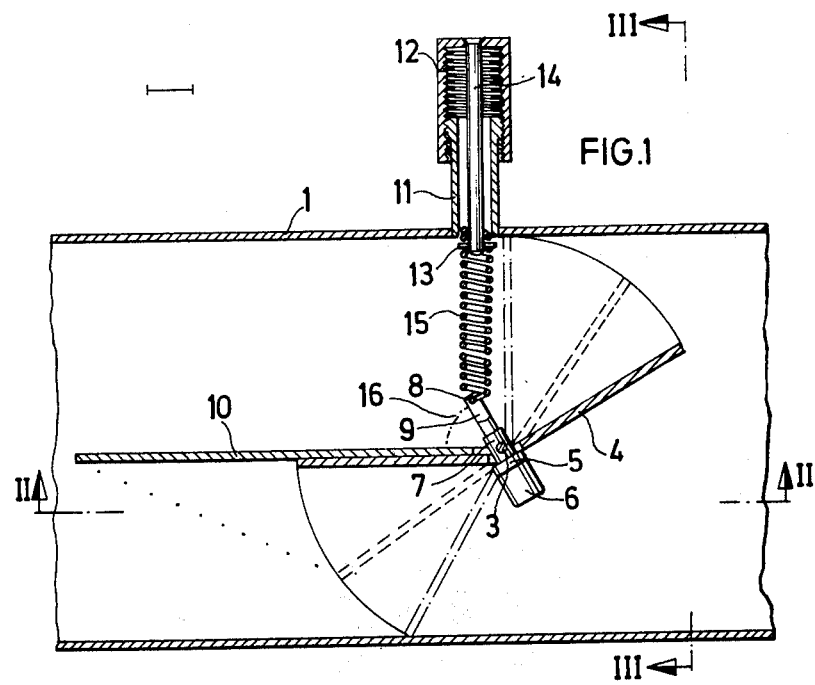
FIG. 1 shows a flow regulator in longitudinal section on the line I—I in FIG. 2.

A tubular regulator housing 1 with a round duct cross-section is adapted to be inserted into an air duct, gas duct or liquid duct as far as two ridges which are not shown. At a distance of 3% of the diameter of the housing 1 as measured from the center axis 2 of the cross-section, a shaft 3 is arranged which is provided with point or pivot bearings 30. On the shaft 3 there is a flap 4 which is angled trough about 30° in the centre of its longitudinal section. It is attached to the shaft 3 in a fixed manner by the use of three clamping pieces, of which the center one is denoted by 5 and the two outer ones are denoted by 6 and which are mounted with an offset on the angle of the flap and have a projection 7 passing through the flap. The projection 7 has a hole and is mounted on the shaft 3 and there is an axial screw extending into the hole. By means of such screw the shaft 3 and the flap 4 are clamped together in front of the offset of the clamping piece. The screw indicated in FIG. 1 of the center clamping piece 5 is a pin screw having an eye 8 at its end and with its somewhat greater length forms a lever arm 9. The two outer clamping pieces 6 are, in front of the angle of the flap, constructed as cylindrical counter-weights, which ensure that the axis of gravity of the flap lies in the axis of the shaft. In the open position, which is located or determined by a disc 10 which is described below, the one limb of the flap 4 contacts the disc 10 in a position parallel to the tube or duct axis to the rear and the other limb is aligned obliquely forwards. In the closed position shown in broken lines the latter limb lies in a cross-sectional plane of the tubular housing 1 and the first limb extends obliquely towards the rear.

Opposite to the lever arm 9 a tube connector 11 with an external screw thread is arranged in the wall of the regulator housing 1 and on the connector a screw cap 12 of comparatively large axial length is mounted. On the end wall of this screw cap there is attached a rod 14 which extends through the pipe connector 11 into the cross-section of the duct and at its end is provided with a cross pin 13. On the rod 14 a helical spring 15 is mounted in such a manner that some of its coils extend past the cross pin 13. The other end of the helical spring 15 is hooked into the eye 8 of the lever arm 9.

The helical spring 15 is hardly stressed with the length shown in FIG. 1 in the open position of the flap 4. Its coils have in this condition a pitch which is substantially equal to the screw lead of the screw cap 12.

Figure 4:
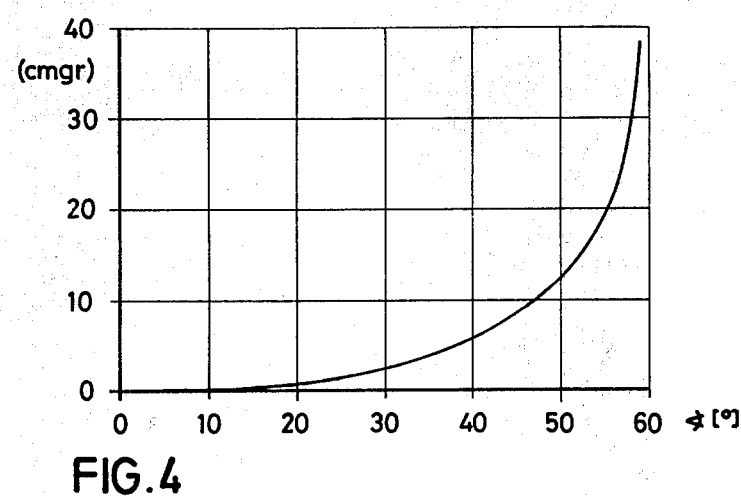
FIG. 4 shows the torque characteristic of the flow regulator.

The lever arm 9 in the open position of the flap makes an angle of approximately 10° to 20° obliquely to the cross-section of the duct (shown in FIG. 1 on an exaggerated scale) and on turning of the flap as far as its closed position describes a circular arc 16 represented in broken lines. It will be apparent that this arc at its initial point lying generally on the geometrical axis of the rod 14 is comparatively oblique to the spring force direction and the oblique setting steadily decreases towards the end of the arc, especially as the spring on rotation of the lever arm is somewhat swung out of position; that is to say it departs from an initially almost perpendicular direction in relation to the spring force direction into an alignment which is finally approximate in line with the spring force. The result of this is a torque which increases out of proportion with the turning of the flap 4 as compared with the same degree of angle of turn, as is represented in FIG. 4. Such a torque is necessary in the case of the type of regulator considered here with an angled flap in order to achieve a downstream pressure or flow respectively which always remains constant owing to a suitable flap setting being assumed in the case of the various possible upstream pressures which occur.

In order to set the flow regulator to a predetermined pressure of regulation, by turning the screw cap 12, the rod 14 is screwed to a greater or lesser extent into the helical spring 15 and accordingly the effective screw length is more or less shortened so that the displacement of the lever arm 9 results in an extension of the spring, which in relation is more or less pronounced, and therefore there is a more or less pronounced increase in the spring force. The biasing action of the spring is hardly changed owing to the agreement between the spring pitch and the screw lead and in the case of a somewhat lesser screw lead it is only slightly increased. A spring, which in the case of its total length and possibility of shortening as determined by the space relationships within certain limits has the necessary relationship between the steepness of its spring characteristic and the number of effective spring turns or coils can be selected by a suitable choice of the spring diameter and the spring wire diameter.

The disc 10 extends in the axial direction of the tubular housing 1 behind the shaft 3 in the same plane as the latter. It is made up of a rectangular section lying against the housing wall on both sides and a generally semi-circular section which is adajent to this. The rear contour of the disc 10 is a representation of the first-mentioned flap limb in regard of the flow, in the case of a center setting of the flap 4 as indicated in the drawing in dashed lines, that is to say it lies against the flow wall represented in points which extends from the edge of the flap limb. The space between the disc 10, the flap limb and the flow wall is accordingly hydrodynamically enclosed. Accordingly it remains free of turbulence, which could cause the flap to move and the air enclosed in it acts on the flap as a damping cushion, when the flap is subjected to a tendency to vibrate by the flow. In the case of other angular settings of the flap and also other flow speeds the rear disc contour admittedly does not completely engage the flow wall, but however in this case as well the flap is protected against the effect of irregularities in flow. The rearmost point of the end of the disc is spaced behind the shaft 3 by a distance somewhat exceeding the radius of the regulator housing.

Figure 2:
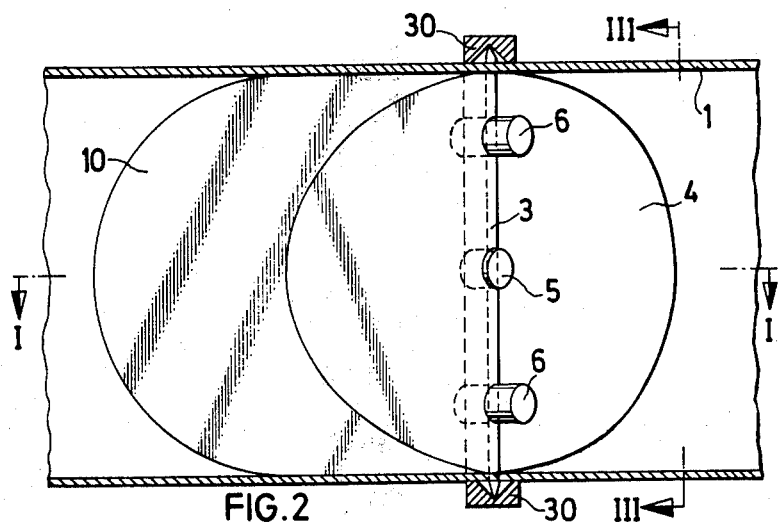
FIG. 2 shows the flow regulator in a longitudinal section, perpendicular to this section, along the line II—II in FIG. 1.
Figure 3:
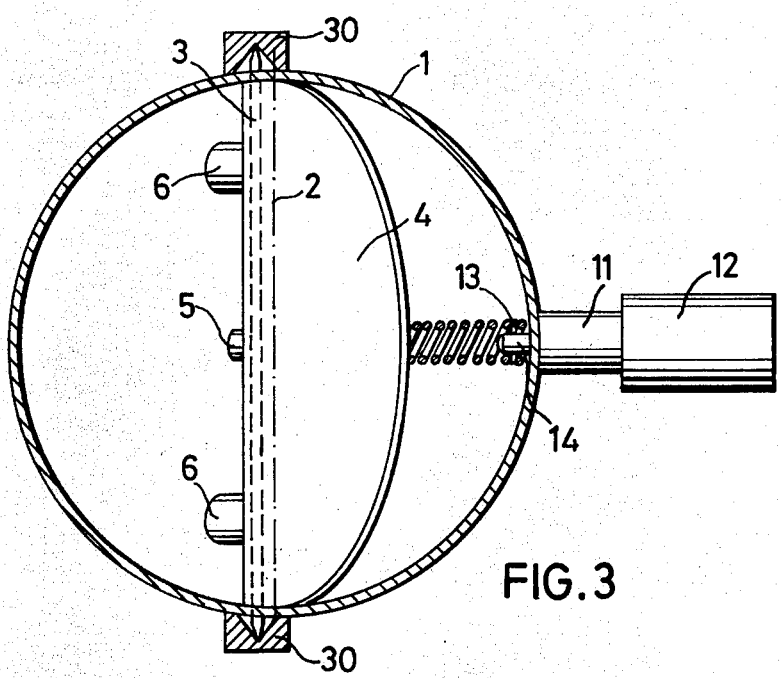
FIG. 3 shows the flow regulator in a cross-section in accordance with line III—III in FIGS. 1 and 2.
Figure 5:
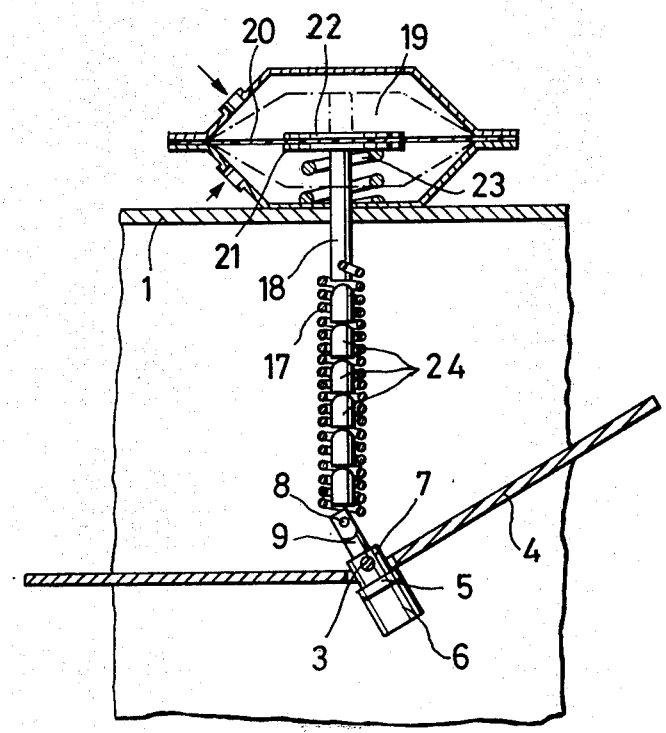
FIG. 5 shows a further flow regulator in a view corresponding to FIG. 1.

In FIG. 5, which represents a further embodiment of the invention, similar parts are denoted by the same reference numerals as in FIGS. 1 to 3. Departing from the embodiment in accordance with FIGS. 1 to 3 a spring 17 of constant length engages the lever arm 9. The spring is held on the side of the housing wall by a rod 18 and the rod 18 is guided in a longitudinally shifting manner through the housing wall in a pressure transducer 19 or membrane chamber with a membrane 20 which is attached by means of a flange 21 and a counter-disc 22 to the rod. A compression spring 23 between the housing wall and the flange 21 is of such a thickness that on tightening the spring 17 as far as the closed position of the flap 4 it hardly reacts while on the other hand when compressed air acts on the outer side of the transducer 19 it can however be compressed together. The inner space of the spring 17 between the end of the rod 18 and the end of the lever arm 9 is filled with cylindrical blocks 24 which are rounded at one end.

If the spring 17 is to have a more pronounced degree of biasing than in the normal condition shown in FIG. 5, the lower part of the pressure transducer 19 is accordingly subjected to the action of compressed air and as a result the rod 18 is further drawn out. By acting on the outer part of the transducer owing to the stiffening of the spring 17 with the blocks 24 it is possible to ensure that the flap 4 is positively closed. The two actions are shown in broken lines in the drawing of the pressure transducer.

The blocks 24 simultaneously tend to damp the spring 17. In the case of the embodiment in accordance with FIGS. 1 to 3 as well the spring can have a stiffening means, which also acts for damping of vibrations, for example in the form of a clothing.

I claim:

1. In a fluid ducting section, a flow regulator comprising a flap for varying the free ducting cross-section, a shaft mounted transversely in the ducting section near the central axis thereof, said flap being mounted on said shaft for rotation about the shaft axis to vary the free ducting cross-section, said flap comprising first and second portions obtusely angled relative to each other along a bend line near said shaft, said ducting section having an air inlet end and an air outlet end defining the direction of air flow therethrough, means defining an open position and a closed position for said flap, said first and second portions being angled relative to each other such that in the open position of said flap the first portion is directed downstream from said shaft generally parallel to the direction of air flow and the second portion is directed obliquely upstream, and in the closed position said second portion is directed substantially perpendicular to the ducting axis and said first portion is directed obliquely downstream, whereby air flow against said second portion biases said flap toward the closed position, and spring means biasing said flap toward the open position, said spring means being adapted to act from the direction of the wall of the ducting section on a lever arm attached to the shaft in such a manner that the point of action of the force on rotation of the flap out of the open position into the closed position describes a circular arc, which arc at the beginning is more oblique to the direction of the spring force than at the end.

2. A flow regulator in accordance with claim 1, wherein a helical spring which is preferably substantially perpendicular to the axis of the duct engages the lever arm.

3. A flow regulator in accordance with claim 2, wherein the helical spring at the side of the ducting section wall is attached to an adjustable holding means.

4. A flow regulator in accordance with claim 3, wherein the holding means has an axially sliding and rotatable rod which extends axially into the helical spring and holds the latter by means of a cross pin arranged at the end of the rod, the cross pin extending between the coils of the helical spring.

5. A flow regulator in accordance with claim 4, wherein the rod is journalled by means of a screw means which has a lead the same or slightly smaller than the pitch of the helical spring in the unstressed condition.

6. A flow regulator in accordance with claim 5, wherein the rod extends through a tube connector arranged at the ducting section wall, the rod having its end mounted on a screw cap mounted on the tube connector.

7. A flow regulator in accordancce with claim 3, wherein the helical spring is attached to a rod extending into the ducting section and being axially displacable by a remote control means.

8. A flow regulator in accordance with claim 7, wherein the rod has its end, remote from the helical spring, on the membrane of a membrane pressure transducer.

9. A flow regulator in accordance with claim 2, wherein the helical spring is provided with a stiffening means.

10. A flow regulator in accordance with claim 9, wherein the stiffening means consists of blocks placed in the helical spring and preferably being cylindrical and each rounded at one end.

11. A flow regulator in accordance with claim 1, wherein the shaft of the flap has a point bearing arrangement.

12. A flow regulator in accordance with claim 1, wherein an axial disc in the ducting section lies in the direction of flow downstream from the flap shaft and is aligned with the latter, the position and contour of the rear end of the disc being substantially a representation of the first-mentioned flap limb as regards the flow in the case of the half open position of the flap.

13. A flow regulator in accordance with claim 12, wherein the rear disc end generally has the contour of a semi-circle with a radius equal to the clearance diameter of the ducting section and the disc extends for a length behind the shaft equal to twice this radius.

* * * * *